Patented Nov. 16, 1948

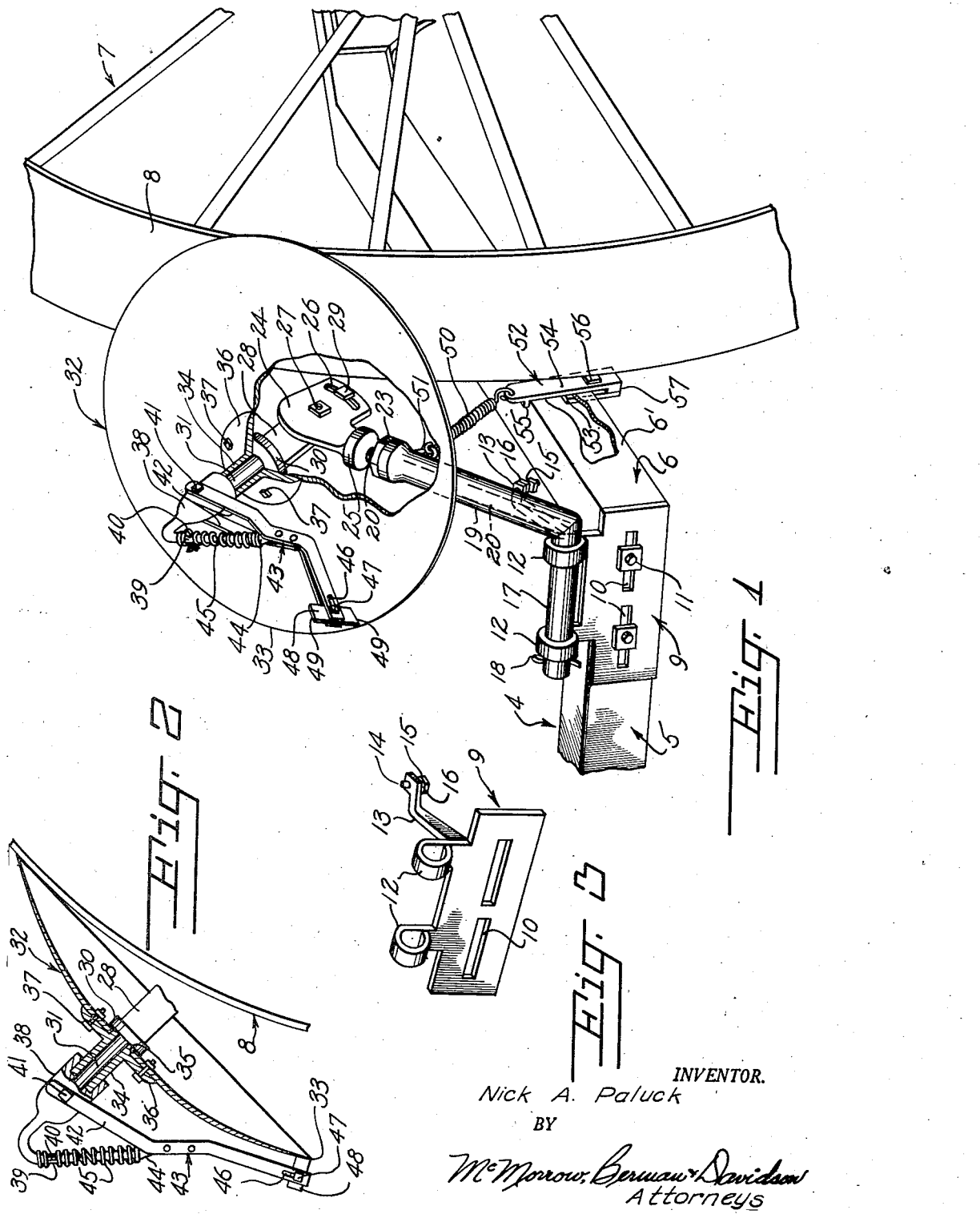

2,454,002

UNITED STATES PATENT OFFICE 2,454,002

WHEEL SCRAPER

Nick A. Paluck, Belfield, N. Dak.

Application March 9, 1948, Serial No. 13,910

5 Claims. (Cl. 280—158)

This invention relates to improvements in wheel scrapers for agricultural implements and the like, the primary object of the invention being to provide a wheel scraper of this type incorporating self-cleaning means which eliminates clogging of the scraper so that the related wheel is maintained free of mud and vegetation even while the implement is traversing muddy or freshly turned soil.

Another important object of the invention is to provide a disk type wheel scraper of the above indicated character which is adjustable to either maintain a predetermined clearance with the rim of the wheel or to maintain constant flexible contact with the wheel rim, and which can be adjusted to an out of the way position when desired.

Another important object of the invention is to provide a disk type wheel scraper of the nature indicated above which includes a spring pressed constantly operative auxiliary scraping means whose tension is adjustable to provide scraping contact with the edge of the disk for keeping the disk free of accumulations of mud, earth, and vegetation or combinations thereof, whereby the wheel rim scraping efficiency of the disk is constantly maintained, while rotated by its contact with the wheel.

Other important objects and advantageous features of the invention will be apparent from the following description and accompanying drawings, wherein for present purposes of illustration only, a specific embodiment of the invention is set forth in detail.

In the drawings:

Figure 1 is a fragmentary front perspective view showing a grain drill, with a wheel scraper in accordance with the present invention mounted on the frame thereof and in operative relation to a wheel.

Figure 2 is a fragmentary vertical transverse section showing the scraper disk adjusted to engage the wheel rim, and Figure 3 is a perspective view of the mounting bracket.

Referring to the drawings in detail, the numeral 4 generally designates the front part of a grain drill frame, including the front cross-member 5 and the longitudinal side member 6, alongside of which the wheel 7 is arranged, which has the flat ground engaging rim 8, from which accumulations of mud, dirt and vegetation are to be scraped. The device of the invention is equally adaptable to clean wheels having concave rims or rubber tires.

The illustrated wheel scraper comprises the elongated plate-like mounting bracket 9 adapted to lie along the front face of the frame cross member 5 and provided with transverse slots 10, 10 affording lateral adjustability with respect to mounting bolts 11, 11 traversing the cross member 5, the upper edge of the bracket having spaced bearing eyes 12, 12 and a rearwardly and upwardly projecting stop arm 13 provided with an adjustable stop 14 comprising a cap screw 15 and a lock nut 16.

The L-shaped tubular scraper arm comprises a lateral stub axle 17 journaled in the bearing eyes 12, 12 with a cotter key 18 traversing the free end of the stub axle outside one eye to hold the same in place, and the arm 19.

Threaded into the upper end of the arm 19 is a shank 20 on a flat plate-like reclining L-shaped bracket 24 having a disk-like stop shoulder 25 and formed in its lateral arm with an arcuate slot 26, arranged concentrically with respect to a pivot bolt 27 traversing the central part of the bracket 24. Vertically arranged alongside of the bracket 24 is the flat shank 28 whose intermediate part is pivoted on the bolt 27 and whose lower part carries a tightening or locking bolt 29 which traverses the arcuate slot 26. Loosening the bolt 29 enables adjusting the shank 28 on the pivot 27. A jam nut 23 on the threaded shank 20 is provided to engage the upper end of the arm portion 19 to lock the shank 20, and hence the bracket 24, after the proper side tilt of the disk scraper has been achieved with respect to the wheel rim.

On the upper end of the flat shank 28 is a bearing disk 30 from whose center rises a spindle 31 on which the scraper disk 32 is rotatably supported, the scraper disk being concavo-convex in shape tapered to a relatively sharp edge 33. The disk is mounted on a tubular bearing 34 which projects through a center hole 35 in the disk and rests rotatably upon the bearing disk 30, as shown in Figure 2, and has a radial flange 36 above the disk secured thereto by bolts or rivets 37, the bearing 34 being a running fit on the spindle 31.

Fixed to the spindle 31 above the tubular bearing 34 and capping the upper part of the bearing is an upwardly-tapered cylindrical cap 38 terminating at its upper end in a declining lateral lug 39 traversed by a cotter key 40. Pivoted on axially aligned bolts 41, 41 on opposite sides of the cap 38 are arms 42, 42 of a scraper fork 43, which includes a lug 44 at the juncture of the arms 42, 42 aligned with the lug 39 and with the latter acting as mounts for the opposite ends of a helical expanding spring 45. Upper convolutions of the spring 45 are arranged above and below the cotter pin 40 so that by rotating the spring the tension thereof may be adjusted to push the auxiliary scraper fork 43 downwardly with suitable force. As indicated in Figure 2, the fork 43 beyond the arms 42, 42 is downwardly offset, with the extremity thereof longitudinally slotted at 46 to adjustably accommodate the bolts 47 projecting from opposite sides of the disk scraper 48, which is rectangular in form to provide interchangeable straight edges 49 for scraping engagement with the upper side of the edge portion of the main scraper disk 32.

The stop screw 15 on the arm 13 of the scraper mounting bracket 9 may be adjusted to engage the underside of the tubular scraper arm 19 to hold the scraper disk 32 in a predetermined spaced relation to the wheel rim 8, so that the disk, one side only of which overlies the wheel rim, will be turned to exert scraping action only when engaged by accumulations on the wheel rim; or the stop screw 15 may be adjusted to permit the scraper disk to rest directly upon and be rotated by the wheel rim 8, with which the disk is then continuously kept in yielding contact by a spring 50 stretched between an eye 51 on the upper part of the tubular arm 19 and the upper end of a spring anchor 52 secured to the implement frame longitudinal member 6.

The spring anchor 52 comprises a U-shape having one short leg 53 engaging behind the vertical flange 6' of the frame member 6, and a long leg 54 rising along the outer side of said flange and to a point thereabove where it is provided with a stop lug 55 engaging the top of the member 6. A bolt 56 traverses the legs near the bight portion 57 to engage the lower edge of the said flange 6' in opposition to the lug 55 to hold the U-shape in place.

From the foregoing it will be apparent that with the device adjusted with the disk 32 in contact with or spaced from the wheel rim 8, the tangential angularity of the disk 32 with respect to the wheel rim may be adjusted by loosening the bolt 29 and tilting the disk on the axis of the pivot 27. The tilt of the disk 32 may be adjusted in an inboard or in an outboard direction by loosening the nut 23 on the shank 20, as already explained above. The slots 10, 10 in the mounting bracket 9 enable lateral adjustment of the entire assembly.

What is claimed is:

1. A scraper for the rim of a wheel of an implement having a frame positioned alongside of the wheel, said scraper comprising a mounting bracket adapted to be secured to said frame and having transversely-aligned horizontal bearing means, a vertical tubular scraper arm having a lateral stub axle journaled in said horizontal bearing means, a shank in the upper end of said tubular scraper arm, means for locking said shank in a desired longitudinally and rotatably adjusted position in said tubular scraper arm, a bracket on the upper end of said shank, a vertical spindle pivoted to said bracket on a horizontal transverse axis, means for locking said spindle in a desired pivoted relation to said bracket, a scraper disk rotatably mounted on said spindle having a side portion thereof overlying the wheel rim in scraping relation thereto.

2. A scraper for the rim of a wheel of an implement having a frame positioned alongside of the wheel, said scraper comprising a mounting bracket adapted to be secured to said frame and having transversely-aligned horizontal bearing means, a vertical tubular scraper arm having a lateral stub axle journaled in said horizontal bearing means, a shank in the upper end of said tubular scraper arm, means for locking said shank in a desired longitudinally and rotatably adjusted position in said tubular scraper arm, a bracket on the upper end of said shank, a vertical spindle pivoted to said bracket on a horizontal transverse axis, means for locking said spindle in a desired pivoted relation to said bracket, a scraper disk rotatably mounted on said spindle having a side portion thereof overlying the wheel rim in scraping relation thereto, a spring pressed auxiliary scraper mounted on said spindle having a scraper blade in contact with the edge portion of said scraper disk and operating to scrape the said scraper disk as the scraper disk is rotated by contact with the wheel rim or with accumulations on said wheel rim.

3. A scraper for the rim of a wheel of an implement having a frame positioned alongside of the wheel, said scraper comprising a mounting bracket adapted to be secured to said frame and having transversely-aligned horizontal bearing means, a vertical tubular scraper arm having a lateral stub axle journaled in said horizontal bearing means, a shank threaded into the upper end of said tubular scraper arm, means for locking said shank in a desired longitudinally and rotatably adjusted position in said tubular scraper arm, a bracket on the upper end of said shank, a vertical spindle pivoted to said bracket on a horizontal transverse axis, means for locking said spindle in a desired pivoted relation to said bracket, a scraper disk rotatably mounted on said spindle having a side portion thereof overlying the wheel rim in scraping relation thereto, said mounting bracket being adapted to be positioned forwardly of the wheel with said tubular scraper arm rearwardly inclined to position said scraper disk along the forward side of the wheel rim, a stop arm on said mounting bracket having a stop adjustable to engage the underside of said tubular scraper arm so as to give said scraper disk a predetermined close spacing from the surface of the wheel rim.

4. A scraper for the rim of a wheel of an implement having a frame positioned alongside of the wheel, said scraper comprising a mounting bracket adapted to be secured to said frame and having transversely-aligned horizontal bearing means, a vertical tubular scraper arm having a lateral stub axle journaled in said horizontal bearing means, a shank threaded into the upper end of said tubular scraper arm, means for locking said shank in a desired longitudinally and rotatably adjusted position in said tubular scraper arm, a bracket on the upper end of said shank, a vertical spindle pivoted to said bracket on a horizontal transverse axis, means for locking said spindle in a desired pivoted relation to said bracket, a scraper disk rotatably mounted on said spindle having a side portion thereof overlying the wheel rim in scraping relation thereto, said mounting bracket being adapted to be positioned forwardly of the wheel with said tubular scraper arm in a rearwardly inclined position resulting in positioning said scraper disk along the forward side of the wheel rim, a spring anchor secured to said frame at a point behind said mounting bracket, and a contractile spring stretched between said tubular scraper arm and said anchor acting to yieldably maintain said scraper disk in contact with the wheel rim.

5. A scraper for the rim of a wheel of an implement having a frame positioned alongside of the wheel, said scraper comprising a mounting bracket adapted to be secured to said frame and having transversely-aligned horizontal bearing means, a vertical tubular scraper arm having a lateral stub axle journaled in said horizontal bearing means, a shank threaded into the upper end of said tubular scraper arm, means for locking said shank in a desired longitudinally and rotatably adjusted position in said tubular scraper arm, a bracket on the upper end of said shank, a vertical spindle pivoted to said bracket on a horizontal transverse axis, means for locking said spindle in a desired pivoted relation to said bracket, a scraper disk rotatably mounted on said spindle having a side portion thereof overlying the wheel rim in scraping relation thereto, a spring pressed auxiliary scraper mounted on said spindle having a scraper blade in contact with the edge portion of said scraper disk and operating to scrape the said scraper disk as the scraper disk is rotated by contact with the wheel rim or with accumulations on said wheel rim, said spring pressed scraper comprising an element fixed on said spindle above said scraper disk, an arm pivoted to said element and extending laterally therefrom, a scraper carried by the outer end of said arm engaged with the upper surface of the edge portion of said scraper disk, and spring means operating between said element and said arm maintaining said scraper in contact with said scraper disk.

NICK A. PALUCK.

No references cited.